March 2, 1937.  T. A. DARRINGTON  2,072,443
SALTING OF THE INTESTINES OF ANIMALS PRIOR TO
THE USE OF SAID INTESTINES AS SAUSAGE SKINS
Filed May 20, 1936  2 Sheets-Sheet 1

INVENTOR:
THOMAS AUGUSTUS DARRINGTON,
BY HIS ATTORNEY,

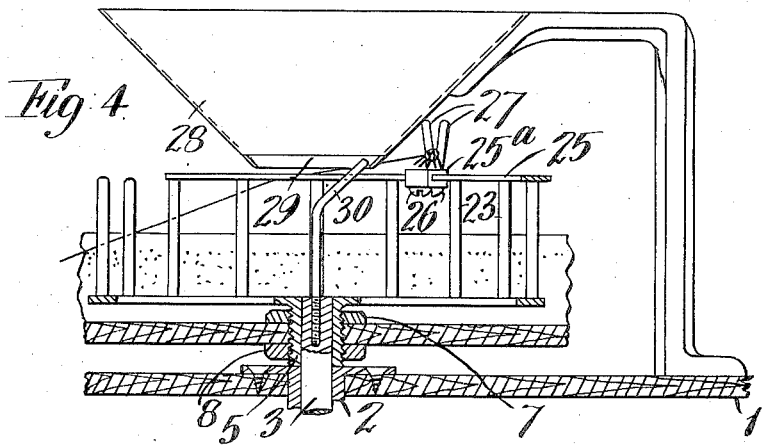
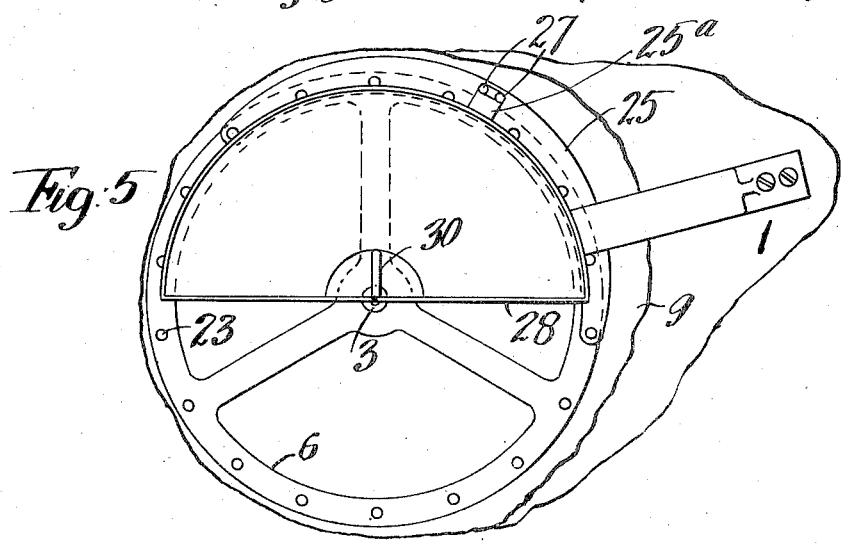
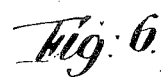
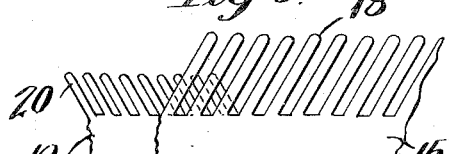
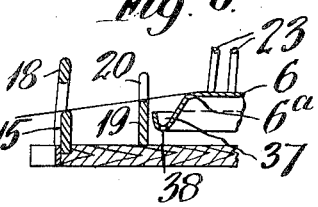

UNITED STATES PATENT OFFICE 2,072,443

SALTING OF THE INTESTINES OF ANIMALS PRIOR TO THE USE OF SAID INTESTINES AS SAUSAGE SKINS

Thomas Augustus Darrington, Smithfield Market, England

Application May 20, 1936, Serial No. 80,870
In Great Britain February 18, 1935

15 Claims. (Cl. 99—254)

The present invention relates to an improved method and means for salting the intestines of animals prior to the use of said intestines as sausage skins.

In the treatment of the intestines of pigs or other anmials for the purpose of rendering said intestines suitable for use as sausage skins, they are first of all cleaned.

After the intestines have been cleaned, and whilst they are still in a wet condition they, and/or the parts which have been broken therefrom, are each measured by hand, and a number of them are placed side by side and made into the form of a hank, after which the said hank is manually salted by being rubbed in or drawn through a pile of salt, some of which salt adheres all over the hank on account of the moisture thereof.

The number of intestines and/or parts thereof in a hank is dependent upon their individual lengths and the total length of intestine it is required that each hank shall contain.

The salted hank is then usually placed on a draining-board to allow surplus liquid to drain therefrom, and is then again manually rubbed in or drawn throught salt. After this, the hank is allowed to dry, and when dry, it is ready for storage and/or transport.

According to the present invention the intestines or parts of intestines are salted individually by drawing them lengthwise through a bed of salt which is formed upon a moving body, the direction of motion of each of the intestines being transversely of or inclined at a suitable angle relatively to the direction of motion of said bed.

A machine whereby the invention can be carried into effect comprises a moving body in the form of a disc having a drum or the like fixed to its centre, means for rotating said disc and means for feeding salt thereto to form a circular bed around said drum but in spaced relationship thereto, whereby after the ends of a skin or bunch of skins has been attached to said drum, the said skin or bunch of skins will be wound thereon, at the same time being drawn more or less transversely through the moving salt bed.

In cases where the machine is intended to deal with bunches of skins, two series of fixed pins or teeth are provided, each of said series being arranged concentrically with the aforesaid disc, one of said series being arranged adjacent the drum and the other series being arranged adjacent the outer portion of the disc, the arrangement being such that the skins are guided individually by said pins through the salt bed whilst being wound onto the drum.

Preferably the pins or teeth are so arranged as to cause the skins to pass through the moving bed of salt in a direction tangentially of the drum.

The invention will now be described with reference to the accompanying drawings, in which:—

Fig. 3 is a fragmentary view showing certain details.

Figs. 4 and 5 are views showing details of a form of salt feeding device.

Fig. 6 is a fragmentary sectional view of a modified detail.

Figure 1:
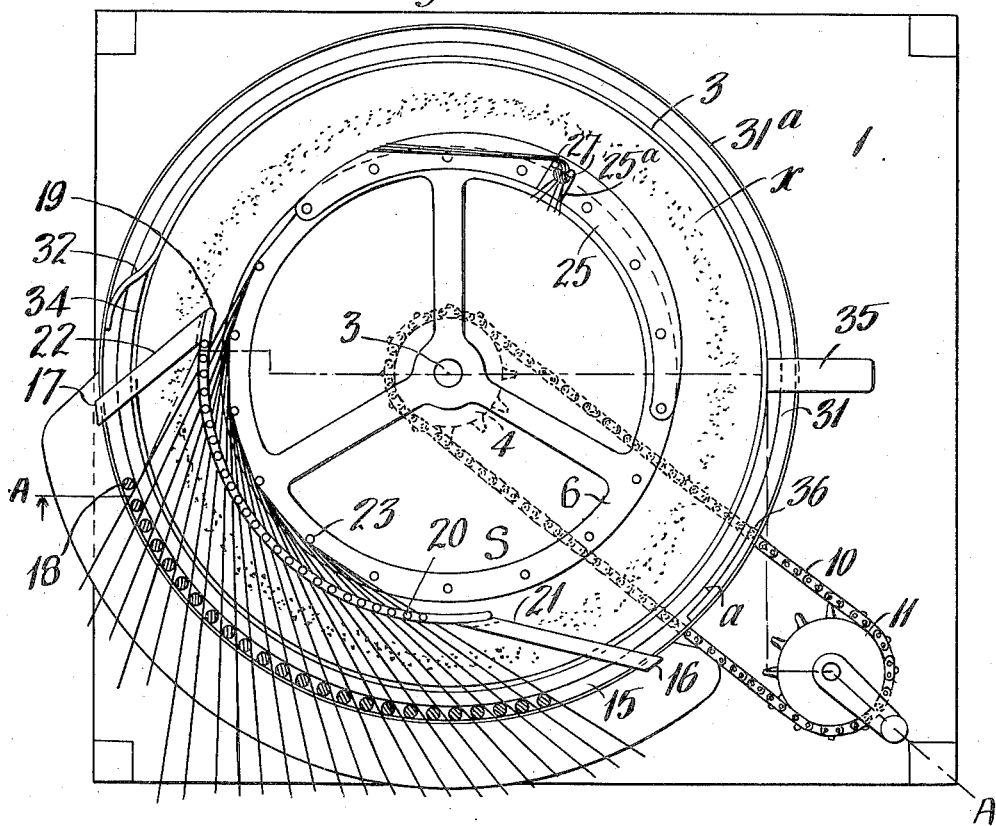
Fig. 1 is a plan of a skin salting machine according to the present invention, with certain parts shown in section.

Referring to the accompanying drawings, 1 indicates a table, in the top of which is provided a bearing 2, through which extends a spindle 3 upon the lower end of which is keyed a sprocket 4, and similarly mounted upon the upper portion of which spindle is a sleeve 5, at its upper end formed integral with a horizontally disposed wheel-like member 6.

The sleeve 5 is externally screw-threaded, and held thereon by means of nuts 7 and 8 is a disc 9.

The sprocket is operatively connected by a chain 10 to a sprocket 11, keyed upon the lower end of a spindle 12, which extends upwardly through a bearing 13, provided within the table top, and at its upper end is provided with an operating handle 14, the arrangement being such that by rotating said handle the member 6 and disc 9 are rotated.

15 indicates a plate bent to conform to the curvature of the outer edge of the disc 9 and held in contact therewith by brackets 16 and 17 secured to the table.

The plate 15 is provided with a series of teeth 18, as shown more clearly in Fig. 3.

19 indicates a second curved plate arranged close to the periphery of the member 6, and provided with a series of teeth 20, as shown more clearly in Fig. 3 the said plate being carried by extensions 21, 22, formed respectively upon the brackets 16 and 17.

The foregoing arrangement is such that the upper surface of the disc 9 is in sliding contact with the lower edge of the plate 19, and the outer edge of said disc is also in sliding contact with the aforesaid plate 15.

Provided around the periphery of the member 6 is a series of upstanding pins 23.

Extending along the outer surface of the lower portion of the plate 15 is an arcuate ledge 24 which is secured to the brackets 16 and 17.

Carried upon the upper ends of some of the pins 23 is a crescent-shaped plate 25, so arranged that its portion of maximum width passes over the upper ends of the teeth 20 as the disc 6 rotates.

Adjustably mounted by a clip 25a and clamping screws 26 upon the plate 25 is a V-shaped body 27.

Fed to the surface of the disc 9 is a supply of salt indicated by X.

Figure 2:
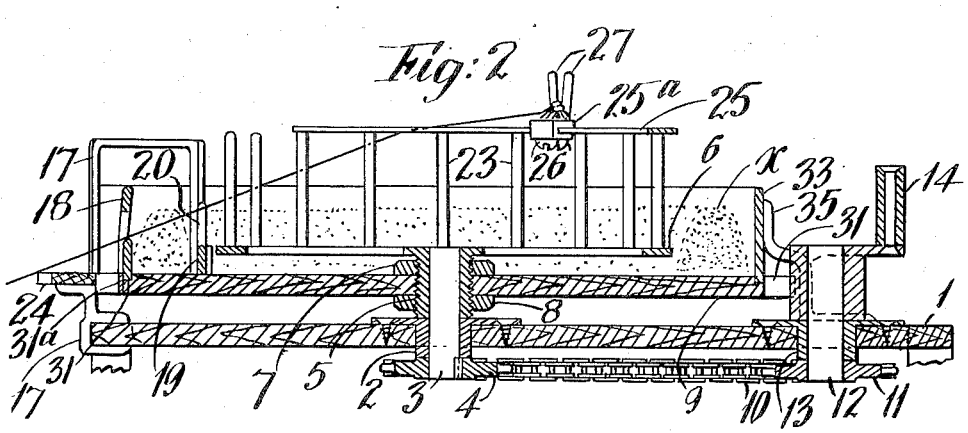
Fig. 2 is a vertical section on line A—A of Fig. 1.

The skins to be salted are bunched and tied together at one end, as shown at Y, and at this end are placed in the body 27, as shown in Figs. 1 and 2, while said body is located at a station more or less diametrically opposite to that in which it is shown.

The skins, while being held more or less taut, are then individually placed or led into position between the teeth 18.

After this the handle is rotated to move the member 6 in a clockwise direction, the position of the body 27 having been so adjusted that when the said body reaches the position in which it is shown in Fig. 1, all the skins have passed between the teeth 20, which latter are arranged with their corresponding teeth 18 upon lines substantially tangential to the periphery of the member 6.

Upon referring to Fig. 3 it will be seen that the teeth 18 have a rearward inclination, and the teeth 20 a forward one.

Fig. 2 shows more clearly the manner in which the individual skins enter between their respective pairs of teeth 20.

The continued rotation of the member 6 winds the skins onto the pins 23, at the same time pulling them through the moving bed of salt X so that they are well salted.

After the skins have been wound onto the pins 23 as just described they may be readily removed by lifting them off at a point more or less diametrically opposite to that at which is situated the body 27.

In order that the whole length of the bunch of skins shall be salted, it is necessary for the operator to salt the knotted and leading end portion by hand by rubbing or drawing this portion in or through a bed of salt prior to attaching the skins, in the manner previously described, to the body 27. As previously stated the salt may be fed in any suitable manner to the disc 9.

In Figs. 4 and 5 is shown an arrangement whereby this may be effected and which includes a semi-frusto conical hopper 28, designed to contain a supply of salt, one side of which hopper is closed by a flat vertical wall which does not extend completely to the lower end of said hopper and this forms a slot 29.

The hopper 28 is so arranged that the outwardly bent upper end of a rod 30 mounted in any suitable manner at its lower end upon the upper end of the spindle 3 continually passes beneath the upper edge of the aforesaid slot 29 (see Fig. 4) and sweeps round the lower end of the hopper and ejects salt therefrom. The hopper 28 can be supported in any convenient manner, for example, by an inserted L shaped bracket (not shown) mounted at its lower end upon the table 1.

Salt ejected from the hopper as just described falls down between the radial arms of the member 6 and onto the disc 9 and is flung outwardly, by the centrifugal force due to the rotation of the said disc, to replenish the bed of salt X.

It will be seen that the plate 15, at its lower edge, rests upon a step portion, indicated by 31, formed around the outer edge of the disc 9, and provided with an outer peripheral wall 31a, formed of a circular strip of metal, which latter is fixed to the said disc.

Connected to the plate 15 is a deflector 32 which forms part of a plate 33, which plate, at its lower edge, forms a sliding fit within an annular groove 34 formed within the disc 9, the plate 33 being held rigid by a bracket 35 secured to the table 1, and by the aforesaid bracket 16 beyond which said plate 33 extends for a slight distance in a clockwise direction.

The purpose of the deflector 32 is to deflect salt inwardly from the edge of the disc 9, thus to prevent it being wasted by falling over the said edge, and so maintain the bed intact, the purpose of the plate 33 being to prevent the salt so deflected from again creeping outward.

A very small amount of salt, however, passes between the walls of the groove 34 and the lower edge of the plate 33.

This salt, however, falls onto the stepped portion 31 and builds up against the rear edge a of the plate 15, but is prevented from falling outward by a plate 36, which last mentioned plate causes it to fall onto the upper surface of the disc 9 on which it is subsequently further deflected by the deflector 32.

In Fig. 6 is shown a fragmentary sectional view of a modified form of member 6 having a peripheral gulley 37 between which and the horizontal portion of said member is formed an outwardly and downwardly inclined portion 6a.

The pins 23 of this member 6 are inwardly inclined in an upward direction, and the height of the member 6 and the angle of the portion 6a is such that the lower ends of the pins 18 and 20 and the upper surface of the adjacent part of said portion lie all in one inclined plane.

By inclining the pins 23 as just described, each convolution of intestine is caused to push a preceding one up to the said pins, the inclination of the portion 6a assisting this action at the same time causing rear ends of any already wound on intestines to be pushed by portions of other intestines still being wound onto the drum and held thereon.

The rear ends of the portions of intestines which are the last to be wound on the drum fall into the gulley 37 and are thus prevented from being flung out by centrifugal force and whipping round or otherwise becoming entangled with the pins 20.

The gulley 37 is perforated as shown at 38 so that any liquid which may collect therein may drain away.

I claim:

1. A machine for salting the intestines of animals comprising a disc, a drum fixed to the centre of said disc, a support upon which said disc is rotatively mounted, means for rotating said disc, a bed of salt upon said disc surrounding said drum but in spaced relationship thereto, together with guiding means, whereby, after intestines have at one end been attached to said drum, and when said disc, and consequently said salt bed, is rotated, said intestines will be wound upon said drum, and, in passing onto the latter, will be guided separately through the moving salt bed.

2. A machine for salting the intestines of animals comprising a disc, a drum fixed to the centre of said disc, a support upon which said disc is rotatively mounted, means for rotating said disc, a bed of salt upon said disc, surrounding said drum, but in spaced relationship thereto, together with guiding means consisting of two fixed series of teeth one of which is disposed between the bed of salt and the drum, and the other of which is disposed on the outer side of said salt bed, whereby, after intestines have at one end been attached to said drum, and when said disc, and consequently said salt bed, is rotated, said intestines will be wound upon said drum, and in passing onto the latter will be guided separately through the moving salt bed.

3. A machine for salting the intestines of animals comprising a disc, a drum fixed to the centre of said disc, a support upon which said disc is rotatively mounted, means for rotating said disc, a bed of salt upon said disc surrounding said drum but in spaced relationship thereto, together with guiding means consisting of a fixed series of teeth inclined upwardly in the direction of motion of said disc and located between said drum and the salt bed, and a second fixed series of teeth inclining upwardly in a rearward direction and disposed upon the outer side of said salt bed, whereby, after intestines have at one end been attached to said drum, and when said disc, and consequently said salt bed, is rotated, said intestines will be wound upon said drum and in passing onto the latter will be guided separately through the moving salt bed in a direction tangential to the drum.

4. A machine for salting the intestines of animals comprising a disc, a drum fixed to the centre of said disc and consisting of a circular base plate and a series of upwardly projecting pins fixed upon said plate and arranged in spaced relationship around the peripheral portion thereof; a support upon which said disc is rotatively mounted; and means for rotating said disc; a bed of salt upon said disc surrounding said drum but in spaced relationship thereto; together with guiding means, whereby, after intestines have at one end been attached to said drum, and, when said disc, and consequently said salt bed, is rotated, said intestines will be wound upon said drum, and in passing onto the latter, will be guided separately through the moving salt bed.

5. A machine for salting the intestines of animals, comprising a disc; a drum fixed to the centre of said disc, and consisting of a circular base plate and a series of upwardly projecting pins fixed upon said plate and arranged in spaced relationship around the peripheral portion thereof; a support upon which said disc is rotatively mounted; means for rotating said disc, a bed of salt upon said disc, surrounding said drum, but in spaced relationship thereto; together with guiding means consisting of two fixed series of teeth, one of which is disposed between the bed of salt and the drum, and the other of which is disposed on the outer side of said salt bed, whereby, after intestines have at one end been attached to said drum, and when said disc, and consequently said salt bed, is rotated, said intestines will be wound upon said drum, and in passing onto the latter will be guided separately through the moving salt bed.

6. A machine for salting the intestines of animals comprising a disc, a drum fixed to the centre of said disc and consisting of a circular base plate and a series of upwardly projecting pins fixed upon said plate and arranged around the peripheral portion, thereof; a support upon which said disc is rotatively mounted; means for rotating said disc, a bed of salt upon said disc, surrounding said drum but in spaced relationship thereto; together with guiding means consisting of a fixed series of teeth inclined upwardly in the direction of motion of said disc and located between said drum and the salt bed, and a second fixed series of teeth, inclining upwardly in a rearward direction and disposed upon the outer side of said salt bed, whereby, after intestines have at one end been attached to said drum and when said disc, and consequently said salt bed, is rotated, said intestines will be wound upon said drum, and in passing onto the latter will be guided separately through the moving salt bed in a direction tangential to the drum.

7. A machine for salting the intestines of animals, comprising a disc, a drum fixed to the centre of said disc, a support upon which said disc is rotatively mounted; means for rotating said disc; a bed of salt upon said disc, surrounding said drum but in spaced relationship thereto; deflecting means for maintaining the bed of salt in a piled up condition, together with guiding means, whereby, after intestines have at one end been attached to said drum, and when said disc, and consequently said salt bed, is rotated, said intestines will be wound upon said drum, and in passing onto the latter, will be guided separately through the moving salt bed.

8. A machine for salting the intestines of animals, comprising a disc, a drum fixed to the centre of said disc; a support upon which said disc is rotatively mounted; means for rotating said disc; a bed of salt upon said disc, surrounding said drum but in spaced relationship thereto; deflecting means for maintaining the bed of salt in a piled up condition together with guiding means consisting of two fixed series of teeth one of which is disposed between the bed of salt and the drum, and the other of which is disposed on the outer side of said salt bed, whereby, after intestines have at one end been attached to said drum, and, when said disc, and consequently said salt bed, is rotated, said intestines will be wound upon said drum and in passing onto the latter will be guided separately through the moving salt bed.

9. A machine for salting the intestines of animals, comprising a disc; a drum fixed to the centre of said disc, a support upon which said disc is rotatively mounted, means for rotating said disc, a bed of salt upon said disc, surrounding said drum but in spaced relationship thereto; deflecting means for maintaining the bed of salt in a piled up condition; together with guiding means consisting of a fixed series of teeth inclined upwardly in the direction of motion of said disc and located between said drum and the said salt bed, and a second fixed series of teeth inclining upwardly in a rearward direction and disposed upon the outer side of said salt bed, whereby, after intestines have at one end been attached to said drum, and when said disc, and consequently said salt bed, is rotated said intestines will be wound upon said drum and in passing onto the latter will be guided separately through the moving salt bed in a direction tangential to the drum.

10. A machine for salting the intestines of animals comprising a disc, a drum fixed to the centre of said disc; a support upon which said disc is rotatively mounted; means for rotating said disc, means for feeding salt to said disc, a bed of salt upon said disc surrounding said drum but in spaced relationship thereto and formed of salt fed to said disc by said feeding means; together with guiding means, whereby, after intestines have at one end been attached to said drum, and when said disc, and consequently said salt bed, is rotated, said intestines will be wound upon said drum, and, in passing onto the latter, will be guided separately through the moving salt bed.

11. A machine for salting the intestines of animals comprising a disc, a drum fixed to the centre of said disc; a support upon which said disc is rotatively mounted, means for rotating said disc, means for feeding salt to said disc, a bed of salt upon said disc surrounding said drum but in spaced relationship thereto and formed of salt fed to said disc by said feeding means; deflecting means for maintaining the bed of salt in a piled up condition; together with guiding means, whereby, after intestines have at one end been attached to said drum, and when said disc, and consequently said salt bed is rotated, said intestines will be wound upon said drum, and in passing onto the latter will be guided separately through the moving salt bed.

12. A machine for salting the intestines of animals, comprising a disc, a drum fixed to the centre of said disc; a support upon which said disc is rotatively mounted, means for rotating said disc, means for feeding salt to said disc; a bed of salt upon said disc surrounding said drum but in spaced relationship thereto and formed of salt fed to said disc by said feeding means, deflecting means for maintaining the bed of salt in a piled up condition; together with guiding means, whereby, after intestines have at one end been attached to said drum, and when said disc, and consequently said salt bed is rotated, said intestines will be wound upon said drum, and in passing onto the latter, will be guided separately through the moving salt bed in a direction tangential to the drum.

13. A machine for salting the intestines of animals, comprising, a disc, a drum fixed to the centre of said disc, a support upon which said disc is rotatively mounted, means for rotating said disc, means for feeding salt to said disc, a bed of salt upon said disc surrounding said drum but in spaced relationship thereto and formed of salt fed to said disc by said feeding means; deflecting means for maintaining the bed of salt in a piled up condition, together with guiding means consisting of a fixed series of teeth inclined upwardly in the direction of motion of said disc and located between said drum and said salt bed, and a second fixed series of teeth inclining upwardly in a measured direction and disposed upon the outer side of said salt bed, whereby, after intestines have at one end been attached to said drum, and when said disc, and consequently said salt bed, is rotated, said intestines will be wound upon said drum, and, in passing onto the latter will be guided separately through the moving salt bed in a direction tangential to the drum.

14. A machine for salting the intestines of animals, comprising a disc, a drum fixed to the centre of said disc; a support upon which said disc is rotatively mounted; means for rotating said disc; means for automatically feeding salt to said disc, a bed of salt upon said disc surrounding said drum but in spaced relationship thereto and formed of salt fed to said disc by said feeding means; deflecting means for maintaining the bed of salt in a piled up condition, together with guiding means consisting of a fixed series of teeth inclined upwardly in the direction of motion of said disc and located between said drum and said salt bed, and a second fixed series of teeth inclining upwardly in a rearward direction and dsposed upon the outer side of said salt bed, whereby, after intestines have at one end been attached to said drum, and when said disc, and consequently said salt bed, is rotated said intestines will be wound upon said drum, and in passing out the latter, will be guided separately through the moving salt bed in a direction tangential to the drum.

15. A machine for salting the intestines of animals prior to their use as sausage skins, comprising means for drawing them lengthwise through a bed of salt, and means for at the same time causing motion between said bed and the intestines in a direction in angular relationship with respect to the direction of lengthwise travel of each of said intestines.

THOMAS AUGUSTUS DARRINGTON.